(12) United States Patent
Hessling von Heimendahl et al.

(10) Patent No.: US 9,085,373 B2
(45) Date of Patent: Jul. 21, 2015

(54) AEROSPACE GROUND MANEUVER LIGHT

(71) Applicant: Goodrich Lighting Systems GmbH, Lippstadt (DE)

(72) Inventors: Andre Hessling von Heimendahl, Koblenz (DE); Alexander Wernicke, Berlin (DE); Anil Kumar Jha, Lippstadt (DE); Christian Schoen, Mainz (DE)

(73) Assignee: GOODRICH LIGHTING SYSTEMS GMBH (DE)

( * ) Notice: Subject to any disclaimer, the term of this patent is extended or adjusted under 35 U.S.C. 154(b) by 59 days.

(21) Appl. No.: 13/901,754

(22) Filed: May 24, 2013

(65) Prior Publication Data

US 2013/0314256 A1 Nov. 28, 2013

(30) Foreign Application Priority Data

May 24, 2012 (EP) .................................... 12169322

(51) Int. Cl.
| | |
|---|---|
| G08G 5/00 | (2006.01) |
| G08B 5/22 | (2006.01) |
| G09F 9/33 | (2006.01) |
| F21V 7/00 | (2006.01) |
| F21V 7/20 | (2006.01) |
| B64F 1/00 | (2006.01) |
| B60Q 1/26 | (2006.01) |
| G08B 5/36 | (2006.01) |
| F21V 3/04 | (2006.01) |
| F21V 7/04 | (2006.01) |
| F21V 7/09 | (2006.01) |
| B64F 1/18 | (2006.01) |
| F21K 99/00 | (2010.01) |

(Continued)

(52) U.S. Cl.
CPC .............. *B64F 1/002* (2013.01); *B60Q 1/2696* (2013.01); *B64F 1/18* (2013.01); *B64F 1/205* (2013.01); *F21K 9/50* (2013.01); *F21V 3/0418* (2013.01); *F21V 3/0436* (2013.01); *F21V 7/0008* (2013.01); *F21V 7/0025* (2013.01); *F21V 7/048* (2013.01); *F21V 7/09* (2013.01); *F21V 29/70* (2015.01); *G08B 5/36* (2013.01); *B64D 2203/00* (2013.01); *F21V 29/004* (2013.01); *F21V 29/54* (2015.01); *F21W 2111/06* (2013.01); *F21Y 2101/02* (2013.01)

(58) Field of Classification Search
None
See application file for complete search history.

(56) References Cited

U.S. PATENT DOCUMENTS

| 5,335,112 A * | 8/1994 | Bennett et al. ................. 359/530 |
| 7,217,004 B2 * | 5/2007 | Park et al. ...................... 362/240 |

(Continued)

FOREIGN PATENT DOCUMENTS

| DE | 102007030186 A1 | 1/2009 |
| FR | 2790443 A1 | 9/2000 |

OTHER PUBLICATIONS

European Search Report dated Jul. 18, 2012 for Application No. 12169322.0-1268.

*Primary Examiner* — Daniell L Negron
*Assistant Examiner* — Mohamed Barakat
(74) *Attorney, Agent, or Firm* — Cantor Colburn LLP

(57) ABSTRACT

Aerospace ground maneuver light, comprises a reflector (14), the reflector (14) defining a light exit plane (18), an LED light source (26) arranged outside of the area defined by the reflector (14) and its light exit plane (18), and a mounting bar (22) which has a longitudinal extension and at which the LED light source (26) is mounted. The mounting bar (22) extends across the reflector (14) and is spaced apart from the light exit plane (18) of the reflector (14) and comprises a mounting side (24) facing towards the reflector (14) and its light exit plane (18), with the LED light source (26) arranged on the mounting side (24) for emitting light towards the reflector (14).

11 Claims, 5 Drawing Sheets

(51) Int. Cl.
*B64F 1/20* (2006.01)
*F21V 29/70* (2015.01)
*F21V 29/00* (2015.01)
*F21W 111/06* (2006.01)
*F21Y 101/02* (2006.01)
*F21V 29/54* (2015.01)

(56) References Cited

U.S. PATENT DOCUMENTS

| | | | |
|---|---|---|---|
| 7,278,766 B2 * | 10/2007 | Machi et al. | 362/470 |
| 7,300,185 B1 * | 11/2007 | Ruffin et al. | 362/347 |
| 7,391,340 B2 * | 6/2008 | Malhomme | 340/947 |
| 7,940,003 B2 * | 5/2011 | Kamikawa et al. | 313/512 |
| 7,997,769 B2 * | 8/2011 | Foo | 362/294 |
| 8,162,507 B2 * | 4/2012 | Inaba | 362/243 |
| 8,192,060 B2 * | 6/2012 | Wilkinson et al. | 362/470 |
| 8,449,159 B2 * | 5/2013 | Rice | 362/545 |
| 2004/0114355 A1 | 6/2004 | Rizkin et al. | |
| 2004/0114366 A1 | 6/2004 | Smith et al. | |
| 2005/0185417 A1 | 8/2005 | Mayer et al. | |
| 2006/0039157 A1 * | 2/2006 | Sormani et al. | 362/518 |
| 2008/0007430 A1 * | 1/2008 | Wang et al. | 340/947 |

* cited by examiner

A  corresponds to angle range of -5° to 0° in the diagram of Fig.6
A' corresponds to angle range of 0° to 5° in the diagram of Fig.6
B  corresponds to angle range of 5° to 35° in the diagram of Fig.6
C  corresponds to angle range of -5° to -35° in the diagram of Fig.6

AEROSPACE GROUND MANEUVER LIGHT

PRIORITY CLAIM

This application claims priority to European Patent Application No. 12169322.0 filed May 24, 2012, and all the benefits accruing therefrom under 35 U.S.C. §119, and which contents of which in its entirety are herein incorporated by reference.

BACKGROUND OF THE INVENTION

The present invention relates to an aerospace ground maneuver light and, in particular, a taxi light or a runway turn-off light for an aircraft.

Aerospace ground maneuver lights require specific light distributions. For example, an aerospace taxi light requires a light distribution which comprises a peak in the center having an intensity of 30 kcd or more and an opening angle of 35° or more horizontally and of 5° or more vertically. The opening angles are defined as the angles within which the intensity of the light is more than 10% of the peak intensity which should be as homogeneous as possible.

In modern aircraft lights, LED light sources are used. The common way of designing an aerospace ground maneuver light employing LED light sources and having a specific light distribution as e.g. mentioned above, is to use a combination of several LED light sources, all having one or more secondary optical elements such as e.g. total internal reflection (TIR) or refractive optical elements. Due to the difficulties of creating the homogeneous light distribution in the horizontal direction, it is necessary to use light that is distributed over a wide angle. To guarantee enough light in the outer areas with these light beams, the intensity of the beams has to be very high, thus tending to include much more light in the center area than required.

The current solutions not only have inferior optical efficiency but, moreover, the whole unit only fulfills the requirements by producing much more light than actually being required.

It is an object of the present invention to provide an aerospace ground maneuver light and, in particular, a taxi light and/or runway turn-off light for an aircraft having an increased optical and electrical efficiency by using a reduced number of LED light sources and optical elements.

BRIEF DESCRIPTION OF THE INVENTION

The present invention provides an aerospace ground maneuver light like e.g. an aerospace taxi and/or runway turn-off light, comprising a reflector, the reflector defining a light exit plane, an LED light source arranged outside of the area defined by the reflector and its light exit plane, and a mounting bar which has a longitudinal extension and at which the LED light source is mounted, wherein the mounting bar extends across the reflector and is spaced apart from the light exit plane of the reflector, wherein the mounting bar comprises a mounting side facing towards the reflector and its light exit plane, with the LED light source arranged on the mounting side for emitting light towards the reflector, wherein a dividing plane is defined by the mounting bar, with the mounting bar extending longitudinally along the dividing plane which in turn extends (i) through the LED light source as well as (ii) perpendicular to the light exit plane and divides the reflector in two reflector halves arranged at opposite sides of the dividing plane, and wherein each reflector half comprises (i) a first reflector surface portion 30 arranged directly adjacent to the dividing plane for reflecting light of the LED light source towards a focal point located outside of the mounting bar, and (ii) a second reflector surface portion located directly adjacent to the first reflector surface portion for reflecting light of the LED light source in a direction substantially perpendicular to the light exit plane.

According to the present invention, the aerospace ground maneuver light comprises a reflector defining a light exit plane. Light emitted from an LED light source is directed towards the reflector which reflects the light into the desired direction so as to create the desired light distribution both in the horizontal as well as the vertical plane. The LED light source is mounted at a mounting bar which is arranged in front of the light exit plane and spaced apart therefrom when looking at the light exit plane with the reflector there behind.

The mounting bar can be made from thermally conductive material like e.g. metal and may serve as a heat sink for cooling the LED light source. Moreover, 15 the mounting bar can comprise an active or passive cooling means. For example, the cooling means can comprise a cooling fluid or liquid passing through the cooling means or the mounting bar or an element thermally coupled to the mounting bar. A passive cooling means can comprise e.g. cooling fins or the like elements thermally coupled to the mounting bar and creating an enlarged surface subjected to the environment or surrounding of the light.

If in the aerospace ground maneuver light according to the invention, a rather typical reflector like e.g. a parabolic reflector is used, the mounting bar which extends across the light exit plane with the LED light source being mounted at the underside of the mounting bar facing towards the reflector, would block light beams which accordingly cannot exit the aerospace ground maneuver light, resulting in a decreased optical efficiency. Accordingly, in the present invention, the reflector has a special design as explained hereinbelow.

Namely, the reflector of the aerospace ground maneuver light according to the invention extends at opposite sides of a dividing plane which is defined by the mounting bar extending longitudinally along the dividing plane. Accordingly, the dividing plane intersects the mounting bar. Moreover, the dividing plane extends perpendicular to the light exit plane. Also, the dividing plane generally intersects the LED light source as well as the reflector which, accordingly, is divided in two reflector halves arranged at opposite sides of the dividing plane.

According to the present invention, each reflector half comprises a first reflector surface portion and an adjacent second reflector surface portion. The transition between both a first and a second reflector surface portion is smooth and typically continuous so that the tangents at the contacting ends of both reflector surface portions coincide. The first reflector surface portion is arranged directly adjacent to the dividing plane. Accordingly, the first reflector surface portions of the two reflector halves are directly adjacent to each other and connected to each other. The first reflector surface portions are designed to the effect that light emitted from the LED light source and reflected by the first reflector surface portions is directed left and right to the lateral sides of the mounting bar. Accordingly, the first reflector surface portions of both reflector halves guarantee that no light beam impinging on the respective first reflector surface portion is blocked by the mounting bar. The reflected light from the first reflector surface portion of each reflector half is directed to a respective focal point located outside of the mounting bar and typically at the height of the mounting bar.

The second reflector surface portion of each reflector half is located directly adjacent to the first reflector surface portion of the respective reflector half Accordingly, a first reflector surface portion is arranged between the dividing plane and a respective second reflector surface portion. The second reflector surface portion is designed so as to reflect light emitted from the LED light source in a direction substantially perpendicular to the light exit plane.

According to one aspect of the present invention, the first surface portions are comprised of adjacent slices of parabolic reflector sections each having an optical axis, and the optical axes of the adjacent parabolic reflector slice sections are oriented differently with respect to the dividing plane, with the parabolic reflector slice sections being closest to the dividing plane having their optical axes tilted away from the dividing plane at the most and with the optical axes of the parabolic reflector slice sections becoming increasingly perpendicular to the light exit plane the farther away from the dividing plane they are located, while the second reflector surface portions each are of a partially parabolic shape.

A plurality of the reflectors including adjacent LED light sources can be arranged in a housing wherein a plurality of reflectors including associated mounting bars and LED light sources are located within the housing, and wherein the light exit planes are aligned substantially in parallel to each other or coincide with each other to form an overall light exit plane of the housing.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DETAILED DESCRIPTION OF THE INVENTION

Figure 1:
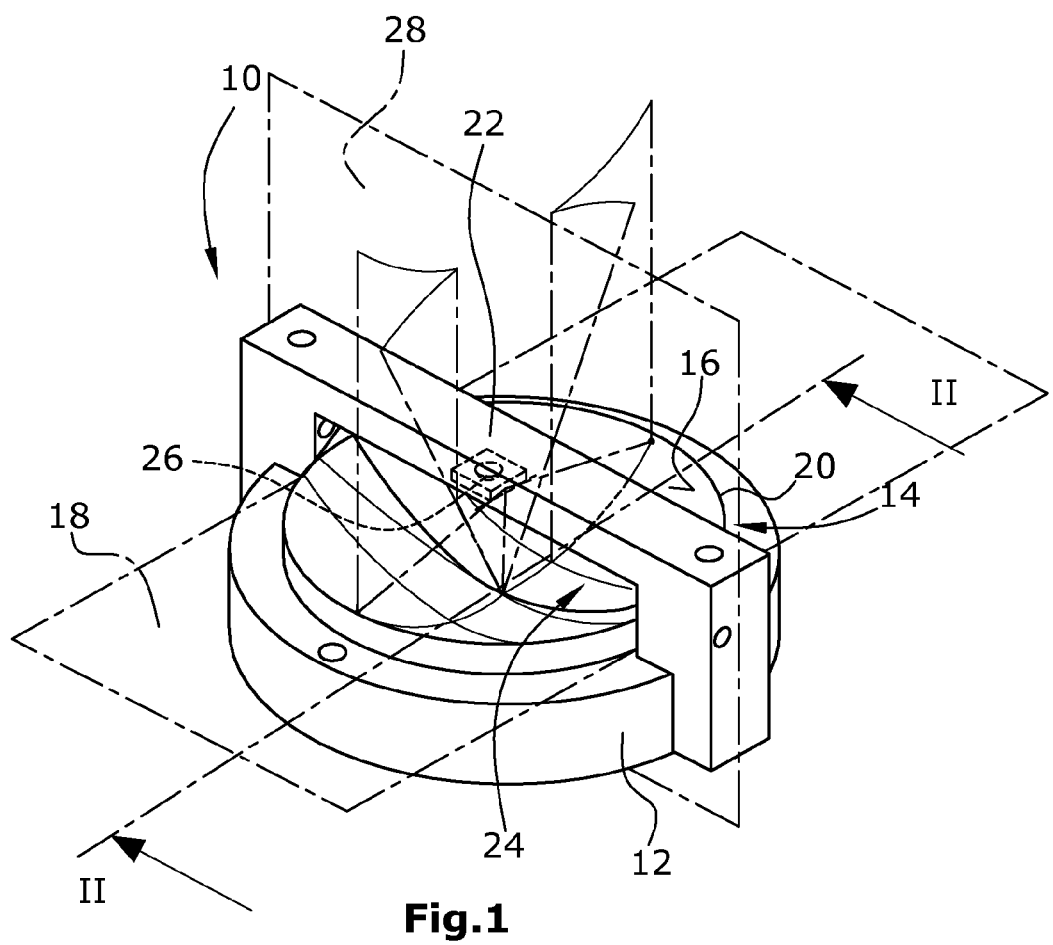
FIG. 1 is a perspective view of an embodiment of an aerospace ground maneuver light according to the invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
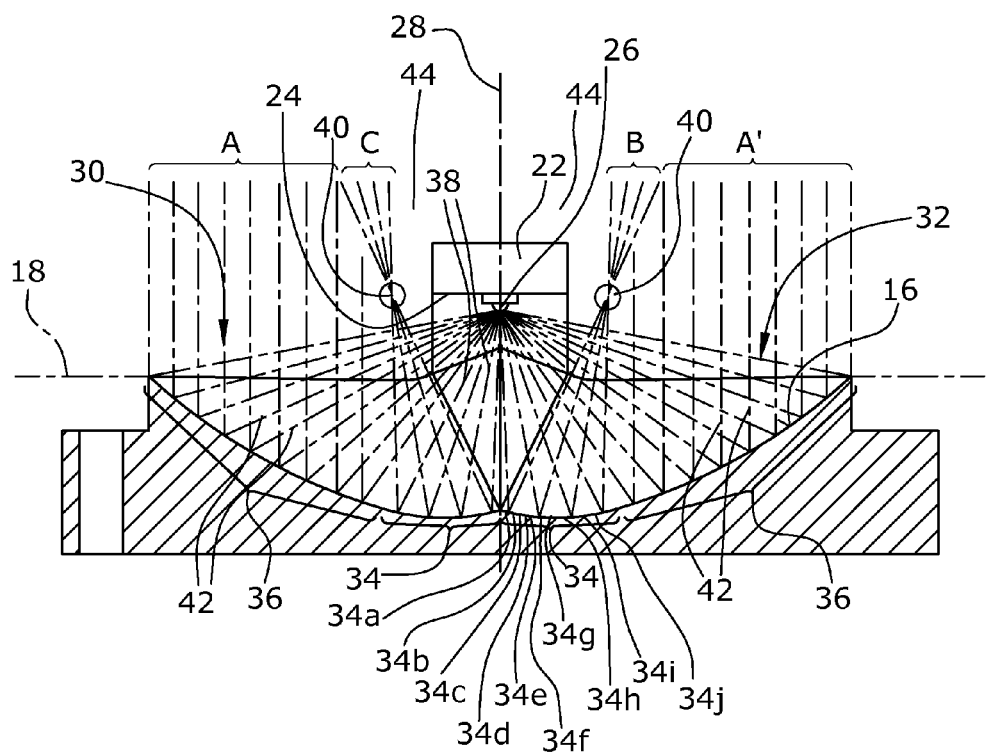
FIG. 2 is a cross-sectional view of the light according to FIG. 1.

FIGS. 1 and 2 show the basic elements of an embodiment of an aerospace ground maneuver light according to the invention. The light 10 according to FIG. 1 comprises a holder 12 for a reflector 14. The reflector 14 defines a reflector surface 16 and a light exit plane 18 (see FIG. 2) which is defined by the edge 20 of the reflector 14. Above the light exit plane 18, there is arranged an LED mounting bar 22 which in this embodiment is made from metal or another preferably thermal conductive material. However, it is clear that also other materials can be used for the LED mounting bar. The LED mounting bar 22 in this embodiment is formed like a bracket extending across the reflector 14 and having an underside 24 facing towards the reflector 14 and the light exit plane 18 (see also FIG. 2).

An LED light source module 26 is mounted at the underside 24 of the LED mounting bar 22. The light emitted by the LED light source module 26 is directed towards the reflector surface 16 and is reflected so as to pass at the left and right sides of the central LED mounting bar 22 as shown in FIGS. 1 and 2.

When looking at FIG. 2, one can see that the reflector surface 16 is symmetrically shaped with regard to a dividing plane 28 extending perpendicular to the light exit plane 18 on the one hand and centrally through the LED mounting bar 22 as well as through the LED light source module 26 on the other hand. The orientation of the dividing plane 28 is shown in FIGS. 1 and 2. The longitudinal extension of the LED mounting bar 22 is within the dividing plane 28. The dividing plane 28 divides the reflector 14 into two halves 30,32 (see FIG. 2). Each reflector half 30, 32 comprises a first reflector surface portion 34 located directly adjacent to the dividing plane 28. Adjacent to the first reflector surface portion 34, there is arranged a second reflector surface portion 36 which contacts the first reflector surface portion 34 at its end opposite to the dividing plane 28 forming a smooth transition between both reflector surface portions. The reflector surface 16 is substantially continuous. The first reflector surface portions 34 serve for reflecting the light of the LED light source module 26 emitted along the light beams 38 back towards the light exit plane 18 but laterally displaced with respect to the LED mounting bar 22 so as to generate focal areas 40 left and right of the LED mounting bar 22 when looking at FIGS. 1 and 2. The second reflector surface portions 36 serve for reflecting light of the LED light source module 26 emitted along light beams 42 towards the light exit plane 18 in a direction substantially perpendicular to the light exit plane 18 and, accordingly, substantially parallel to each other and parallel to the orthogonal extension of the dividing plane 28 (see also FIGS. 1 and 2). Accordingly, each second reflector surface portion 36 is shaped as a part of a paraboloid. Each first reflector surface 34 is composed of very narrow (nearly zero) parabolic slice sections 34a, 34b, . . . , 34j with their optical axes tilted away from the dividing plane 28 the more the closer to the dividing plane 28 the parabolic slice sections 34a, 34b, . . . , 34j are, with the parabolic slice sections farthest away from the dividing plane 28 (i.e. closest to the second reflector surface portion 36) has its optical axis substantially perpendicular to the light exit plane 18.

By the first and second reflector surface portions and their extensions and shapes as shown in FIG. 2, the horizontal light distribution of the light is defined. The vertical light distribution is defined by the shape and curvature of the first and second reflector surface portions in a direction parallel to the longitudinal extension of the LED mounting bar 22.

As can be seen from FIG. 2, above the LED mounting bar 22 is arranged an area 44 into which no light is reflected. This area e.g. can be used for arranging cooling elements for dissipating heat to the environment generated by the LED light source module 26.

Figure 3:
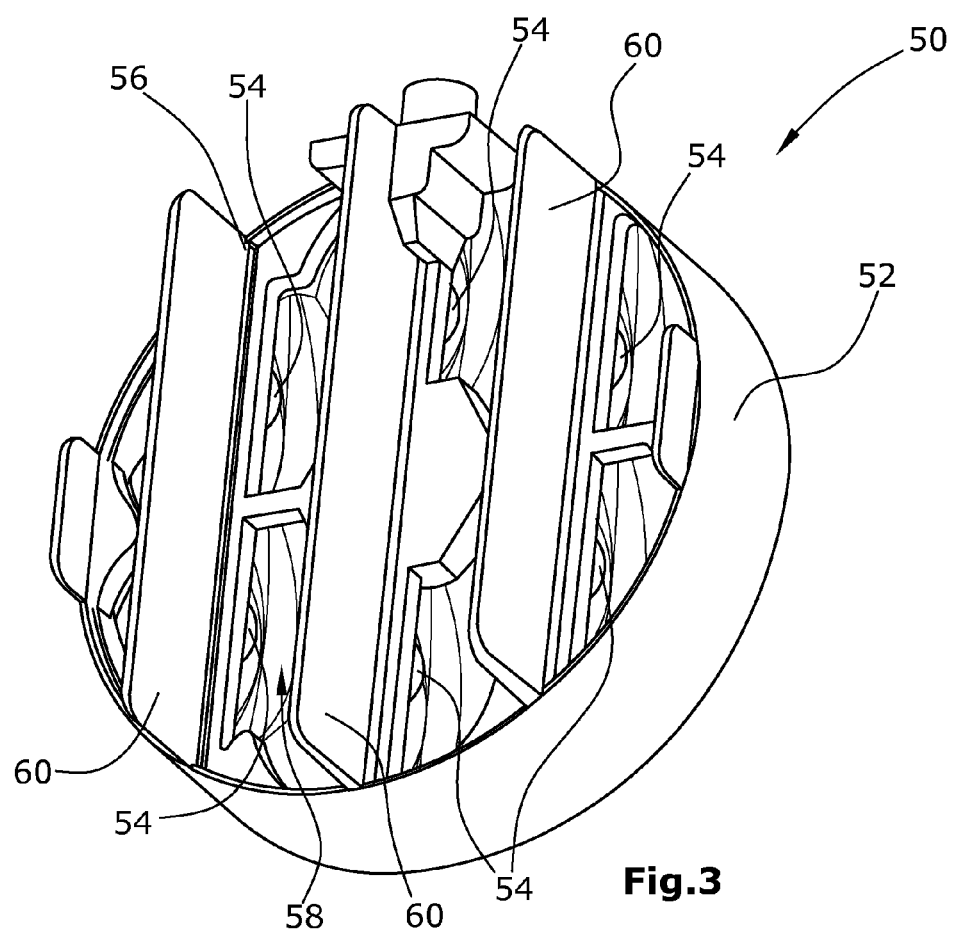
FIG. 3 is a perspective front view of a further embodiment of an aerospace ground maneuver light comprising several LED light sources and associated reflector portions.
Figure 4:
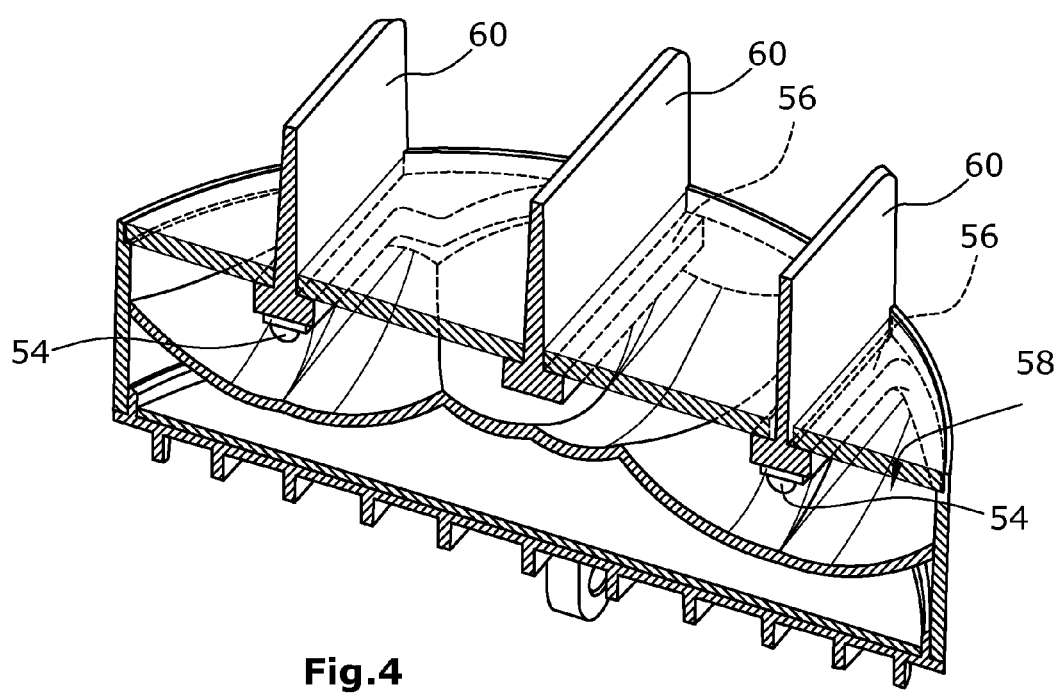
FIG. 4 is a perspective front view of the embodiment of the light according to FIG. 3 with a portion thereof being cut away.
Figure 5:
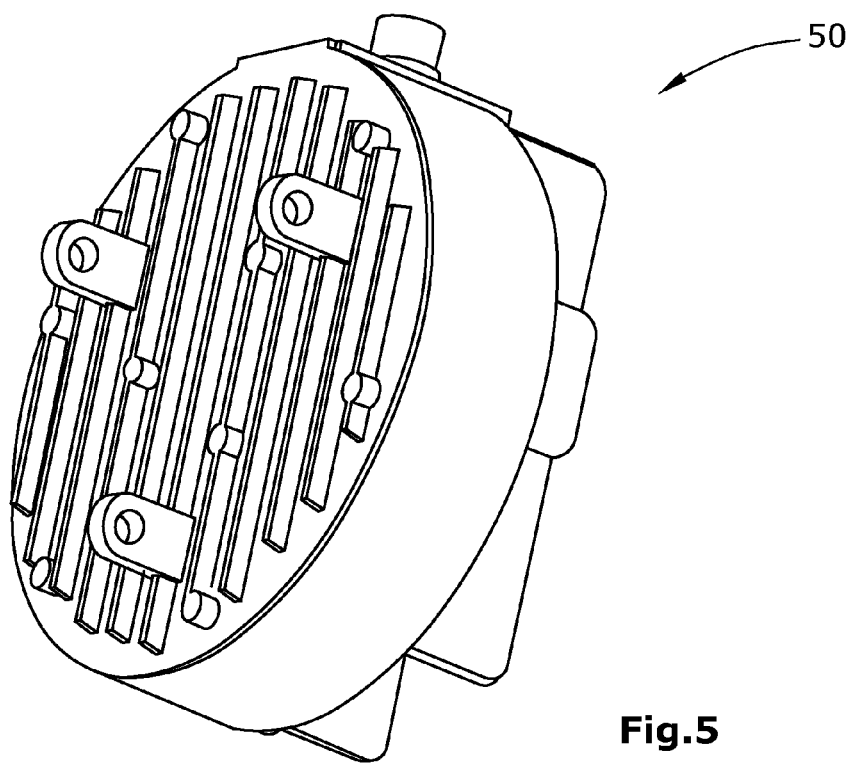
FIG. 5 is a perspective rear view of the embodiment of the light according to FIG. 3.

In FIGS. 3 to 5 there is shown a second embodiment of an aerospace ground maneuver light 50 according to the present invention. In this light 50, there are arranged, within a housing 52, a plurality of LED light source modules 54 mounted at LED mounting bars 56 extending across a light exit plane defined within the housing 52 and located below the LED mounting bars 56. To each LED light source module 54, there is associated a reflector 58 which is designed as shown in FIGS. 1 and 2. It is to be noted here that the reflectors 58 basically comprise those elements of the reflector of the light of the embodiment according to FIGS. 1 and 2 which are located closer to the dividing plane. Accordingly, each reflector 58 comprises preferably symmetrically arranged first and second reflector surface portions as described in FIGS. 1 and 2.

This is shown also in FIG. 4 in more detail.

Also in FIGS. 3 to 5 it is shown that cooling fins or the like passive cooling elements 60 are attached to the LED mounting bars 56 for increasing the cooling effect and cooling efficiency. As the reflectors 58 are designed to not block light coming from the LED light source modules 54, also the cooling elements 60 do not block any light as long as they are located within areas in which no light is reflected (see e.g. area 44 in FIG. 2).

FIG. 5 shows a perspective rear view of the aerospace ground maneuver light 50 including some holding structure for mounting the light 50 at a support structure.

Figure 6:
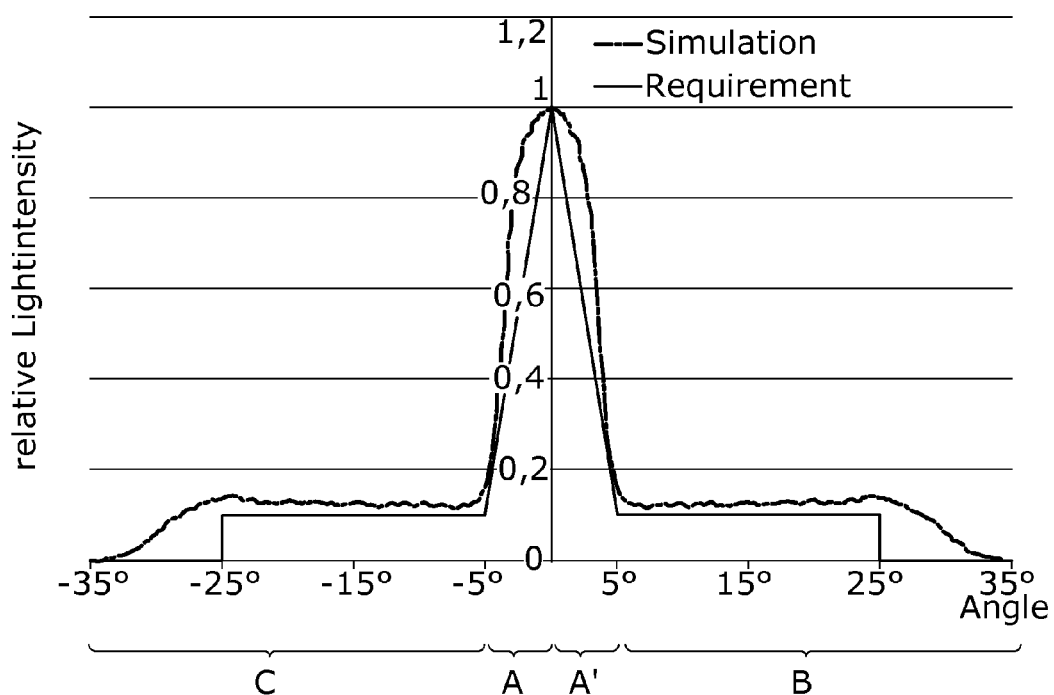
FIG. 6 is a presentation of the legally required and simulated light distributions for an aerospace ground maneuver light.
Figure 7:
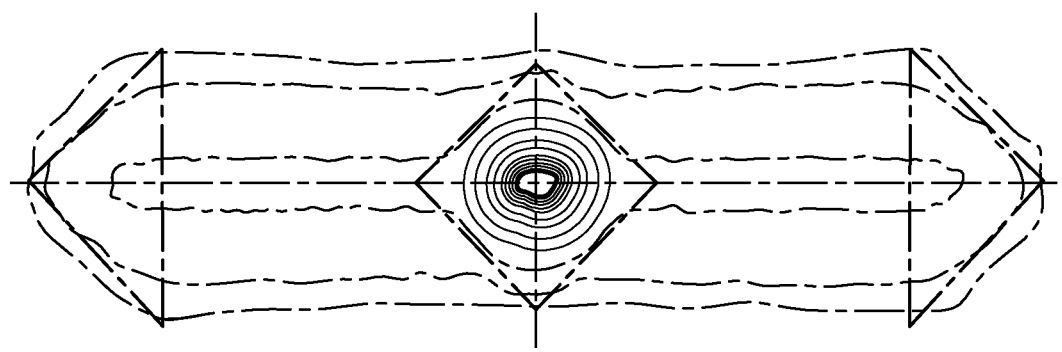
FIG. 7 is another presentation of the simulated light distribution with the LED light source rotated and oriented like a diamond.

FIGS. 6 and 7 show graphs and diagrams of required and simulated light distributions of the light according FIGS. 1 and 2. The light distribution comprises two middle sections A and A' having maximum intensity, and left and right neighboring sections B and C each having a relatively low intensity. The light of the LED light source module 26 reflected by the two second reflector surface portions 36 contributes to the light in the middle sections A and A' having maximum intensity while the light reflected by the two first reflector surface portions 34 results in the light in sections B and C of FIG. 6.

In FIG. 7 it is indicated that the LED light source module 26 can be oriented in a diamond-shaped configuration. The LED light source module 26 generally is defined by an LED die which typically is square-shaped. By orienting this square-shaped LED die like a diamond, the vertical and horizontal light distribution is further improved.

Figure 8:
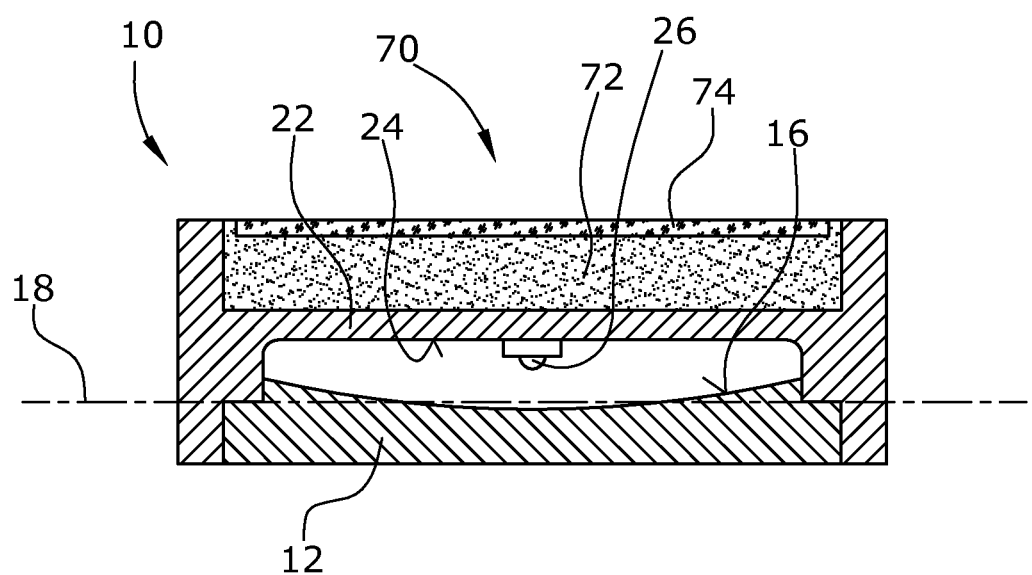
FIG. 8 is a cross-sectional view of the embodiment of the aerospace ground maneuver light according to FIG. 1 with additional elements like a compound lens or cover.

In FIG. 8 it is shown that a compound or the like lens or cover 70 can be attached to the lights according to the embodiment described. The lens or cover 70 in this embodiment comprises a thicker part 72 made from a transparent or translucent plastics material like e.g. polycarbonate (PC) although other plastics and non-plastics materials can be used as well. The part 72 is covered by a preferably erosion resistant top layer 74 which for example can be made from glass or glass ceramics to further improve impact resistance and for reducing weight. It should be clear that also other materials for the top layer 74 can be used. The whole compound cover or lens 70 can be arranged on top of the LED mounting bar or mounting bars or, in case of several mounting bars, can be arranged between adjacent LED mounting bars.

As mentioned hereinabove, the aerospace ground maneuver light according to the present invention comprises a special reflector which serves for the required horizontal and vertical light distribution of an aerospace ground maneuver light. The reflector together with the LED light source module which is located in the focal point of the reflector and which illuminates the reflector, provides for a desired complex light distribution.

As explained above, according to the invention a special reflector is designed. This reflector is configured in a way that in combination with an LED arranged in the focal point of the reflector and illuminating the reflector generates a predetermined complex light distribution.

For designing the reflector, a guiding curve is first calculated on which the base points and respectively peaks of parabolic reflector slices are arranged and which determines the horizontal light distribution. This guiding curve is adapted to the radiation characteristics of the LED in such a manner that all segments of the reflector will generate the same light flux. As a second element, there is then produced a shape curve which will generate the vertical light distribution. In the simplest case, this can be a parabola. The reflector can then be designed in that, for each point on the guiding curve, a parabola tilted around the focal point by the predetermined exit angle, having a focal length adapted to the point, is rotated about the focal-point/base point/peak axis of the parabola and then is intersected along the exit plane. From the "ribs" generated in this manner for all points, and the guiding curve, there can then be generated the surface of the reflector.

According to one embodiment, a free-form reflector which produces a predetermined complex light distribution, e.g. in the illumination of an airfield, in the horizontal and the vertical directions, wherein the light flux loss and the reflector size are minimized. The reflector, when later being integrated into a lamp, allows for further kinds of freedom due to its special geometry and of the generated path of rays.

In some embodiments, the reflector may have one or more of the following properties:

1) Generating a predetermined, complex light distribution.

2) Producing a path of rays not passing the middle axis of the reflector. Thus, no losses will occur due shading by the LED holder.

3) The resultant reflector is not essentially larger—or may even be smaller—than a parabolic reflector with same focal length.

4) Typically, the light beams exiting along the guiding curve will intersect each other (convergent path of rays).

5) Typically, the shape curves (parabolas) on both sides of the guiding curve are symmetric.

6) Typically, both halves of the reflector are symmetric.

One or more of the embodiments disclosed herein may provide from one or more of the following:

1) Since the light distribution is precisely adapted to the requirements, the amount of light which is to be generated can be minimized.

2) Since the desired light distribution is generated directly by the reflector, no need exists for secondary optics.

3) By rotating the quadratic LED by 45° (diamond-shaped orientation) about the optical axis, the light distribution can be still further optimized.

4) Since the path of rays is adapted to the effect that no light will pass through a wide region along the middle axis (through the focal point), the LED used can be thermally connected in an excellent manner with the aid of a wide, deep and also continuous bar without reducing the generated light flux.

5) On the provided bars, also the transparent cover can be mounted. This will increase the impact resistance of the transparent cover.

6) This support structure and the bonding attachment further allow for thinner and thus more light-weighted transparent covers without reducing the impact resistance.

7) New compound-type transparent covers can be used. The compound comprises a thick polycarbonate disk (more than 2 mm) and a thin, erosion-resistant upper top side of glass or glass ceramics so as to further increase the impact resistance and to reduce the weight.

8) The continuous bars make it possible to use, instead of a continuous transparent cover, segmented transparent covers which are fastened between the bars. This allows for a further reduction of space and weight.

9) When using segmented transparent covers, also the thermal concept will be improved since the heat generated on the LED will be dissipated also toward the front.

10) This effect can still be enhanced by additional continuous cooling ribs directly on said bars, i.e. directly at the LED. Due to the path of rays of the reflector, also this will not cause any shading of light.

The invention can be used for any lighting system in order to enhance efficiency of the entire luminous flux of the light source.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. Aerospace ground maneuver light, comprising:
a reflector (14), the reflector (14) defining a light exit plane (18);
an LED light source (26) arranged outside of the area defined by the reflector (14) and its light exit plane (18); and
a mounting bar (22) which has a longitudinal extension and at which the LED light source (26) is mounted;
wherein the mounting bar (22) extends across the reflector (14) and is spaced apart from the light exit plane (18) of the reflector (14), wherein the mounting bar (22) comprises a mounting side (24) facing towards the reflector (14) and its light exit plane (18), with the LED light source (26) arranged on the mounting side (24) for emitting light towards the reflector (14);
wherein a dividing plane (28) is defined by the mounting bar (22), with the mounting bar (22) extending longitudinally along the dividing plane (28) which in turn extends (i) through the LED light source (26) as well as (ii) perpendicular to the light exit plane (18) and divides the reflector (14) in two reflector halves (30,32) arranged at opposite sides of the dividing plane (28); and
wherein each reflector half (30,32) comprises (i) a first reflector surface portion (34) arranged directly adjacent to the dividing plane (28) for reflecting light of the LED light source (26) towards a focal point (40) located outside of the mounting bar (22), and (ii) a second reflector surface portion (36) located directly adjacent to the first reflector surface portion (34) for reflecting light of the LED light source (26) in a direction substantially perpendicular to the light exit plane (18).

2. The aerospace ground maneuver light according to claim 1, wherein the first and second reflector surface portions (34, 36) merge smoothly and continuously.

3. The aerospace ground maneuver light according to claim 1, wherein each first reflector surface portion (34) is comprised of adjacent slices of parabolic reflector sections (34a, 34b, . . . 34j) each having an optical axis, wherein the optical axes of the adjacent parabolic reflector slice sections are oriented differently with respect to the dividing plane (28), with the parabolic reflector slice sections being closest to the dividing plane (28) having their optical axes tilted away from the dividing plane (28) at the most and with the optical axes of the parabolic reflector slice sections becoming increasingly perpendicular to the light exit plane (18) the farther away from the dividing plane (28) they are located, and wherein each second reflector surface portion (36) is of a partial parabolic shape.

4. The aerospace ground maneuver light according to claim 2, wherein each first reflector surface portion (34) is comprised of adjacent slices of parabolic reflector sections (34a, 34b, . . . 34j) each having an optical axis, wherein the optical axes of the adjacent parabolic reflector slice sections are oriented differently with respect to the dividing plane (28), with the parabolic reflector slice sections being closest to the dividing plane (28) having their optical axes tilted away from the dividing plane (28) at the most and with the optical axes of the parabolic reflector slice sections becoming increasingly perpendicular to the light exit plane (18) the farther away from the dividing plane (28) they are located, and wherein each second reflector surface portion (36) is of a partial parabolic shape.

5. The aerospace ground maneuver light according to claim 1, wherein the mounting bar (22) forms a heat sink for cooling the LED light source (26).

6. The aerospace ground maneuver light according to claim 4, wherein the mounting bar (22) forms a heat sink for cooling the LED light source (26).

7. The aerospace ground maneuver light according to claim 1, wherein the mounting bar (22) comprises a passive or active cooling means (60) for cooling the LED light source (26).

8. The aerospace ground maneuver light according to claim 5, wherein the mounting bar (22) comprises a passive or active cooling means (60) for cooling the LED light source (26).

9. The aerospace ground maneuver light according to claim 1, further comprising a housing (52) wherein a plurality of reflectors (58) including associated mounting bars (56) and LED light sources (54) are located within the housing (52), and wherein the light exit planes (18) are aligned substantially in parallel to each other or coincide with each other to form an overall light exit plane of the housing (52).

10. The aerospace ground maneuver light according to claim 5, further comprising a housing (52) wherein a plurality of reflectors (58) including associated mounting bars (56) and LED light sources (54) are located within the housing (52), and wherein the light exit planes (18) are aligned substantially in parallel to each other or coincide with each other to form an overall light exit plane of the housing (52).

11. The aerospace ground maneuver light according to claim 7, further comprising a housing (52) wherein a plurality of reflectors (58) including associated mounting bars (56) and LED light sources (54) are located within the housing (52), and wherein the light exit planes (18) are aligned substantially in parallel to each other or coincide with each other to form an overall light exit plane of the housing (52).

* * * * *